United States Patent [19]
Birnbaum et al.

[11] Patent Number: 5,745,622
[45] Date of Patent: Apr. 28, 1998

[54] HYBRID PLUG-TYPE CONNECTOR WITH MODULAR ELECTRICAL AND LIGHT WAVEGUIDE CONNECTIONS

[75] Inventors: Roland Birnbaum, Aalen; Guenter Dissen, Taufkirchen, both of Germany

[73] Assignee: Siemens Aktiengesellschaft, Munich, Germany

[21] Appl. No.: 708,975

[22] Filed: Sep. 6, 1996

[30] Foreign Application Priority Data

Sep. 8, 1995 [DE] Germany ............... 195 33 295.4

[51] Int. Cl.⁶ ........................................... G02B 6/38
[52] U.S. Cl. .......................... 385/75; 385/53; 385/83; 385/87
[58] Field of Search .......................... 385/75, 76, 77, 385/78, 83, 84, 85, 86, 87, 53, 59, 71, 101; 439/586, 712

[56] References Cited

U.S. PATENT DOCUMENTS

| | | | |
|---|---|---|---|
| 5,109,452 | 4/1992 | Selvin et al. | 385/69 |
| 5,381,498 | 1/1995 | Bylander | 385/83 |
| 5,473,715 | 12/1995 | Schofield et al. | 385/75 |

FOREIGN PATENT DOCUMENTS

| | | | |
|---|---|---|---|
| 0 467 631 | 1/1992 | European Pat. Off. | 385/69 |
| 9411359 U | 2/1995 | Germany . | |
| 43 30 626 | 3/1995 | Germany . | |

*Primary Examiner*—Phan T. H. Palmer
*Attorney, Agent, or Firm*—Hill & Simpson

[57] ABSTRACT

A hybrid plug connector with modular electrical and light waveguide plug connections includes a tub-shaped pin connector housing and a socket connector housing, which can be plugged into one another in overlapping fashion. At least one socket module having jack contacts arranged in a predetermined grid, as well as at least one light waveguide module, which contains at least one single-mode fiber are insertable into the socket connector housing. In order to ensure a modular and variable construction of the mixed plugging system, the modules are inserted into an opening on one side in the socket connector housing and have equal measurements of separation with their outer dimensions. The pin connector housing is provided with plug pins in the tub base to coact with the jack contacts of the socket connectors and also has a light guide countermodule to connect with the optical fibers of the light waveguide module.

10 Claims, 1 Drawing Sheet

HYBRID PLUG-TYPE CONNECTOR WITH MODULAR ELECTRICAL AND LIGHT WAVEGUIDE CONNECTIONS

BACKGROUND OF THE INVENTION

The present invention is directed to a hybrid plug-type connector with electrical and light waveguide plug connections, the connector has a tub-shaped pin connector housing and a socket connector housing, which can be plugged into one another in overlapping fashion, with side walls situated opposite one another in nearly parallel fashion.

A hybrid plug-type connector is disclosed in U.S. Pat. No. 5,109,452, whose disclosure is incorporated herein by reference thereto and which was the basis of European Published Application 0 467 631. The plug-type connector specified in this U.S. Patent is, however, not of a modular construction, but rather the light waveguide plug connectors are arranged in a row between external electrical plug-type connectors and are fixedly integrated into a pin or, respectively, socket connector housing.

German Gebrauchsmuster G 94 11 359.9 (which corresponds to U.S. patent application Ser. No. 08/501,780) discloses a known locking electrical plug system that is already available on the market. This system has overlapping plug housings that can be plugged into one another, which comprise a modular construction to the extent that the socket connection housing is then served for the reception of a contact bearer containing jack contacts, which is inserted into an open transverse side wall in the socket connection housing. The open transverse side is subsequently sealed, at least partially, with a slip-on sealing plate.

SUMMARY OF THE INVENTION

The object of the present invention consists in an integration of light waveguides, including their electro-optical components, such as transmitter and receiver diodes, into a modular plug-type connector. The demand made for such a plug system, specifically in motor vehicle engineering, requires a compact construction with modular and variably equippable elements. In particular, a high degree of interchangeability and ease of servicing should be achieved in the new plug system at a low cost.

To accomplish these goals, the present invention is directed to an improvement in a hybrid connector with electrical and light waveguide plug-type connectors having a tub-shaped pin connector housing and a socket connector housing, which can be plugged into one another in overlapping fashion, with side walls situated opposite one another in a nearly parallel fashion. The improvements comprise at least one socket module being provided, in which jack contacts are arranged in a determined grid, and at least one light waveguide module being provided in which at least one single-mode fiber is attached, the modules being inserted from a side wall in the socket connector housing comprising an equal measure of separation in their outer dimensions, and said plug pin connector housing having a tub-shaped base having plug pins arranged therein for engagement with the jack contacts and having integrated therein at least one light guide countermodule.

Preferably, the light guide module has a centering barrel or sleeve extending from one surface for each light waveguide or fiber and the sleeve is engaged in a corresponding centering bore of the light guide countermodule, which has a cuboid shape with openings on a side surface, through which an electro-optical transducer can be inserted and fixed in such a way that each transducer is oriented centrally to the respective light waveguides in the centering bore. The light guide countermodule and the tub base have coacting mutual detaching locking means.

Both the light waveguide modules and the socket modules have a groove running along one of their longitudinal sides in the direction of insertion, which coacts with a guide web of the socket connector housing for guiding the modules upon insertion into the socket connector housing. The socket connector housing comprises at least two module chambers arranged alongside one another in the transverse direction, with the individual module chambers being at least partially divided by an intermediate rib or wall running parallel to the longitudinal side walls on which the guide webs are arranged on both sides. The guide webs can be fashioned as a locking apparatus for the jack contacts and the socket connector housing has protective stops for the light waveguide ends of the waveguide module.

Other advantages and features of the invention will be readily apparent from the following description of the preferred embodiments, the drawings and claims.

DESCRIPTION OF THE PREFERRED EMBODIMENTS

Figure 1:
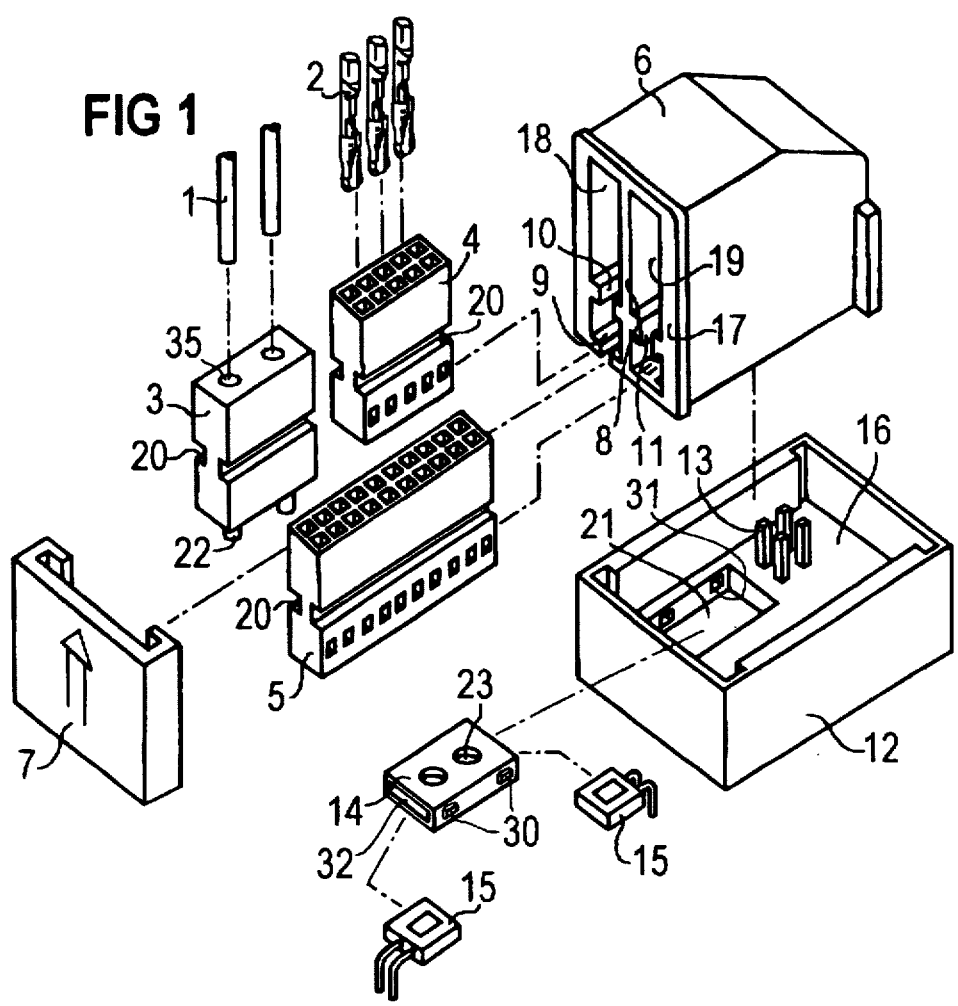
FIG. 1 is an exploded perspective view of a plug-type connector according to the present invention.

The principles of the present invention are particularly useful in a hybrid plug-type connector, which includes a socket connector housing 6, which is assembled with a tub-shaped pin connector housing 12 having a tub base 16.

The socket connector housing 6 has two module chambers 18 and 19 that open toward a transverse side wall 17. The module chamber 19 serves as a receptacle for a 20-pole socket module 5, which is inserted into the module chamber 19 after being equipped with jack contacts 2, on which the associated electrical cables are, for example, crimped. A 10-pole socket module 4, which is equipped with jack contacts 2, and a light waveguide module 3 are successively inserted into the left module chamber 18.

The equipping and strain-relief fastening of, for example, two light waveguides in the module 3, which waveguides 1 are assumed to be a single-mode fiber, is disclosed in a copending U.S. patent application Ser. No. 08/709,102, filed 09/06/96 which claims priority from German Patent Application No. 195 33 296.2, filed Sep. 8, 1996, whose disclosure is incorporated herein by reference thereto. The module 3 has a bore 35 for each waveguide, which bore extends from one end to another end and then terminates in a centering sleeve or barrel 22 that receives a bare end of the waveguide 1. The module has means for clamping the waveguide 1 in the bore 35.

The arrangement shown here of the jack contacts 2 and the modules 4 and 5 is a two-row grid with grid spacing of 2.54 mm, which is often standard, but, however, is not imperative for the present invention. However, the grid spacing and the row-type or, respectively, block-type contact arrangement in the modules 4 and 5 agree, so that all socket modules to be inserted into the socket connector housing 6 comprise the same width dimensions and the same or, respectively, a multiple of the length dimension of the smallest module unit. Correspondingly, according to the present invention, the light waveguide module 3 is also designed according to the same principle of modular construction in its outer dimensions and its constructive design with respect to its insertability into the socket connector housing 6, so that it can be combined with the socket modules 4 and 5, and is compatible with the socket connector housing 6.

Due to high security demands, which are, for example, generally placed on automobile plug-type connectors, it is widely standard to lock the jack contacts 2 in the socket housing with a primary securing means and a secondary securing means that operates independently from the primary securing means. As primary securing means, snap lances that project from the jack contact 2 in the manner of an arrow are often used, which, for example, grasp behind a snap edge in the socket housing after the complete insertion of the jack contacts. Many solutions are also known for the secondary securing, for example locking bolts that additionally work transversely to the plugging direction of the jack contacts.

Figure 2:
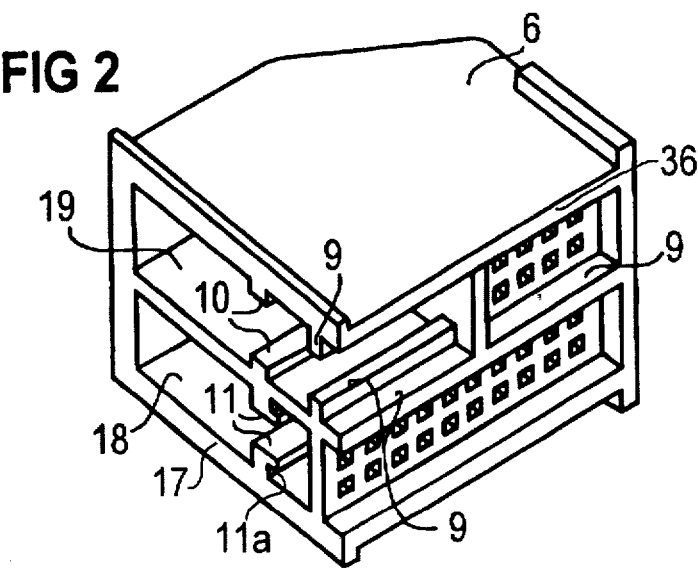
FIG. 2 is a perspective view taken from a lower side of a socket connector housing of the plug-type connector according to the present invention.

The modules 3, 4 and 5, which are shown in FIG. 1, inventively comprise grooves 20 that run in the direction of the insertion of their two longitudinal sides. The grooves coact or work together with guide webs or ribs 10 and 11, which are arranged on inner wall surfaces of the longitudinal walls of the socket connector housing 6, upon insertion of the modules into the chambers 18 and 19. In addition to their guiding function, the guide webs 10 and 11 can unproblematically also be fashioned within the scope of the present invention, so as to serve at the same time as a locking apparatus for the jack contacts 2. This is indicated in the Figure in that the guide web does not necessarily have to be fashioned with a square cross section, such as the guide web 10, but rather can also comprise a cross section that is optimized with respect to its locking function, as illustrated by the guide web 11, which has an undercut 11a, as best illustrated in FIG. 2. For the realization of the primary and secondary securing means in a multi-chamber system, it is advantageous to provide an intermediate rib, wall or partition 8 in the socket connector housing 6. Guide webs 10 or 11 are arranged on both side wall surfaces of this intermediate rib 8, which divides the module chambers 18 and 19. The guide webs, such as 10 and 11, on the rib or partition 8 serve as secondary securing means, given a two-row or, respectively, four-row arrangement of contacts. The intermediate rib or partition 8 advantageously serves at the same time as a bracing element for the socket connector housing 6.

After the insertion of the equipped modules 3, 4 and 5 into the socket connector housing 6, this housing is at least partially sealed by means of a sealing cap 7 that can be slipped on. The electrical and light guide cable, which extend into the modules, can be bent around in the socket connector housing 6 and can be led out, for example, through the remaining opening on the transverse side wall 17. The side wall 17 can comprise a skirt that serves for the receiving and bracing of the seal cap 7, as shown. The resulting hybrid plug-type connector can, thus, have a cable exit oriented to the left or to the right side.

FIG. 1 also shows a pin connector housing 12 terminated at its inner end by a tub base 16. A multiplicity of plug pins 13 corresponding to the jack contacts 2 to be contacted, of which only four are indicated in FIG. 1, are received in the tub base 16. All of these pins, including those which are not shown, are arranged in the socket connector housing 12 in a manner corresponding to the arrangement of the jack contacts 2. As shown, the socket connector housing 6 can form an inner housing of the plug-type connector and can be inserted into the pin connector housing 12, with each of the connectors of the modules 4 and 5 being engaged by a pin 13. The mutual insertion of the two housing halves 6 and 12 with the lowest possible plugging forces and the locking therebetween can, for example, take place by means of an auxiliary means known in itself, such as a toothed lever or snapping hook.

In the pin connector housing 12 shown in FIG. 1, a recess 21 in the tub base 16 is also shown. A light guide countermodule 14 can be placed in this recess. Snap hooks 30 on the sides of the module 14 and fitting grooves 31 in the recess 21 are provided and coact to form a possibility for a mutually detachable snapping of the module 14 in the recess 21. It is well known that in the construction of light waveguide components, the requirement of precision in the micrometer region and the adjustment of the individual fibers to one another, in particular, are always problematical. For the centering of the light waveguide plug-type connectors, it is thus advantageous if, during plugging, centering barrels or sleeves 22 attached to the end of the light waveguide module 3 for guiding the light fibers on the plug-in side are engaged in corresponding centering bores 23 of the light guide module 14.

Transmitting and receiving diodes 15 are advantageously inserted into lateral openings 32 in the ends of the light guide countermodule 14, which, in this case, function as diode bearers. The diodes 15 can, thus, be oriented centrically to the above-positioned centering bores 23 and can subsequently be fixed by gluing or extrusion coating of the diode 15.

FIG. 2 shows a perspective view of the socket connector housing 6, basically from the plugging end side or bottom 36 and from an open transverse side 17. The socket connector housing 6 can advantageously comprise a protective stop 9 for engaging an end surface of the light guide modules. As shown, the protective stops 9 can be fashioned as protective skirts, whereby a considerably improved protection against damage results from the projecting light waveguide ends that project into the countermodule 14.

The inventive hybrid and modular plug system comprises a very large multiplicity of variations. For one, the socket modules with different number of poles and also light waveguide modules of different lengths can be inserted one after the other into the socket connector housing 6 or can be arranged next to one another therein. Since the light guide countermodule 14 is basically fashioned simply as a corresponding counterpiece to the light waveguide module 3, the countermodule 14 can have light waveguides which are mounted as pin-like connections in the countermodule and which fibers can be oriented centrically to the light waveguide fiber ends in the light guide module 3. This arrangement results in the possibility of realizing an optical/optical coupling connector.

The pin connector housing 12 can, thus, for example, be fastened to a circuit board, whereby the plug pins 13 are immediately connected with the circuit board, while the light waveguide contacts are only looped through by means of a plug connector, i.e., are not, as in the embodiment with the diode-bearing light guide countermodule 14, immediately converted into electrical signals in the plug-type connector. The light guide countermodule 14 can, indeed, be equipped with normal electrical plug pins so that a purely electrical plug-type connector results. All of this is possible on the basis of compatible plug-type connector components that are further usable and reusable. The cost is reduced not only in that henceforth several individual connectors can be replaced by one hybrid plug-type connector, but also in that the modular construction also leads to a lower manufacturing expense.

The inventive plugging system can unproblematically be expanded through additional specific constructions. For example, securing ribs or, respectively, codings against inadvertent misplugging can be integrated therein. By means of a corresponding construction of the underside of the socket connector housing or of the stationary securing means 10 or 11, errors in the sequence of the introduction of the modules can be prevented. However, as a rule, this leads to a limitation of the number of variations. It is also possible to provide the light guide modules with springs for a precise positioning in the axial direction. In the radial direction, in the embodiment shown and specified, there is already a lock-in region in the form of the bores provided in the light guide countermodule.

Although various minor modifications may be suggested by those versed in the art, it should be understood that we wish to embody within the scope of the patent granted hereon all such modifications as reasonably and properly come within the scope of our contribution to the art.

We claim:

1. In a hybrid plug connector with electrical and light waveguide plug-type connectors having a tub-shaped pin connector housing and a socket connector housing which can be plugged into one another in an overlapping fashion with side walls situated opposite one another in a nearly parallel fashion, the improvements comprising at least one socket module being provided, said socket module having jack contacts arranged in a determined grid pattern; at least one light waveguide module being provided, said waveguide module having at least one single-mode fiber; said modules being insertable into an opening in a side wall of the socket connector housing with each module having an equal measurement of separation in their outer dimensions; and said pin connector housing having a tub base with a plurality of plug pins being arranged in a specific pattern therein and at least one light guide countermodule being integrated in the tub base.

2. In a hybrid plug connector according to claim 1, wherein the modules have grooves running along two longitudinal sides in the direction of insertion, said grooves coacting with guide webs arranged on inner surfaces of the longitudinal side walls of the socket connector housing for receiving said groove upon insertion of the modules.

3. In a hybrid plug connector according to claim 2, wherein the socket connector housing comprises at least two module chambers arranged alongside one another in a transverse direction.

4. In a hybrid plug connector according to claim 3, wherein the individual module chambers are at least partially divided by an intermediate wall running parallel to the longitudinal walls of the connector housing and said intermediate wall has guide webs arranged on both sides thereof for receiving the corresponding grooves of the modules.

5. In a hybrid plug connector according to claim 2, wherein the guide webs and guide grooves coact to form a locking arrangement for the jack contacts.

6. In a hybrid plug connector according to claim 1, wherein each of the light waveguide modules on one end thereof have a centering sleeve for each light waveguide for receiving the end thereof, and said light guide countermodule having a corresponding centering bore for each of said centering sleeves.

7. In a hybrid plug connector according to claim 6, wherein the light guide countermodule is a nearly cuboidal shape received in a recess in the tub base, said countermodule having recesses on edges for receiving electro-optical transducers to position the transducers in a fixed position relative to the centering bores to be oriented centrically to the respective light waveguide fibers of the light waveguide module.

8. In a hybrid plug connector according to claim 1, wherein the light guide countermodule has light guide fibers which are oriented centrically to the light waveguides that terminate at an end of the light waveguide module.

9. In a hybrid plug connector according to claim 1, wherein the light guide countermodule is received in a recess in the tub base and the module and tub base have coacting locking means for mutually detachably locking the countermodule in said recess.

10. In a hybrid plug connector according to claim 1, wherein the socket connector housing has protective stops for the ends of the light waveguide of the light waveguide module.

* * * * *